United States Patent Office 3,182,075
Patented May 4, 1965

3,182,075
17-SUBSTITUTED 19-NORPREGNA-1,3,5(10),6,8-PENTAEN-20-ONES
Milton David Heller, New City, N.Y., Robert Herman Lenhard, Ridgefield Park, N.J., and Seymour Bernstein, New City, N.Y., assignors to American Cyanamid Company, Stamford, Conn., a corporation of Maine
No Drawing. Filed Oct. 31, 1963, Ser. No. 320,499
14 Claims. (Cl. 260—397.45)

This invention relates to new aromatic steroids. More particularly it relates to novel steroids of the pregnane series having aromatic rings A and B and methods of preparing the same.

The novel steroids of the present invention may be illustrated by the following formula:

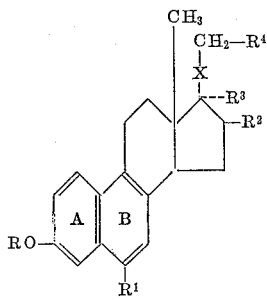

wherein R is selected from the group consisting of hydrogen and lower alkanoyl; $R^1$ is selected from the group consisting of hydrogen, methyl, fluoromethyl, difluoromethyl, trifluoromethyl and fluorine; $R^2$ is selected from the group consisting of hydrogen, ($\alpha$)-methyl and ($\beta$)-methyl; $R^3$ is selected from the group consisting of hydrogen and hydroxyl, $R^4$ is selected from the group consisting of hydrogen, hydroxyl and lower alkanoyloxy and X is selected from the group consisting of $>C=O$ and

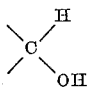

The novel steroids of the present invention are substantially insoluble in water and somewhat soluble in the usual organic solvents.

The starting materials in preparing the present compounds may be illustrated by the formula:

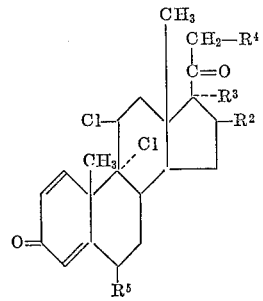

wherein $R^2$, $R^3$ and $R^4$ are as defined above and $R^5$ is hydrogen, ($\alpha$) methyl, ($\alpha$) fluoromethyl, ($\alpha$) difluoromethyl, ($\alpha$) trifluoromethyl, ($\alpha$) fluorine and ($\beta$) fluorine.

The specific intermediates found useful in the process of this invention include:

21-acetoxy-9$\alpha$,11$\beta$-dichloro-17$\alpha$-hydroxypregna-1,4-diene-3,20-dione;
21-acetoxy-9$\alpha$,11$\beta$-dichloro-17$\alpha$-hydroxy-16$\alpha$-methylpregna-1,4-diene-3,20-dione;
21-acetoxy-9$\alpha$,11$\beta$-dichloro-17$\alpha$-hydroxy-16$\beta$-methylpregna-1,4-diene-3,20-dione;
21-acetoxy-9$\alpha$,11$\beta$-dichloro-17$\alpha$-hydroxy-6$\alpha$-methylpregna-1,4-diene-3,20-dione;
21-acetoxy-9$\alpha$,11$\beta$-dichloro-6$\alpha$-monofluoromethyl-17$\alpha$-hydroxypregna-1,4-diene-3,20-dione;
21-acetoxy-9$\alpha$,11$\beta$-dichloro-6$\alpha$-difluoromethyl-17$\alpha$-hydroxy-pregna-1,4-diene-3,20-dione;
21-propionoxy-9$\alpha$,11$\beta$-dichloro-6$\alpha$-trifluoromethyl-17$\alpha$-hydroxypregna-1,4-diene-3,20-dione;
9$\alpha$-11$\beta$-dichloropregna-1,4-diene-3,20-dione;
21-acetoxy-9$\alpha$,11$\beta$-dichloro-6$\alpha$-fluoro-17$\alpha$-hydroxypregna-1,4-diene-3,20-dione;
9$\alpha$,11$\beta$-dichloro-6$\alpha$-fluoropregna-1,4-diene-3,20-dione;
21-hydroxy-9$\alpha$,11$\beta$-dichloro-17$\alpha$-hydroxypregna-1,4-diene-3,20-dione;
21-hydroxy-9$\alpha$,11$\beta$-dichloropregna-1,4-diene-3,20-dione;
and the like.

The process of the present invention is carried out by contacting the starting material with a weak base. The weak base may be for example dimethylformamide, pyridine, collidine, lutidine and the like. The temperature of the reaction may vary from about 15° C. to about 160° C. The time for completing the reaction will depend on the temperature used and may vary from about one-half hour to about 72 hours. After completion of the reaction the desired steroids may be recovered by methods well known in the steroid art.

The compounds of the present invention are physiologically active in reducing cholesterol and therefore have utility as anticholesteremic agents. The compounds also have no appreciable activity as estrogens. This lack of estrogenic activity makes them useful as hypocholesteremic agents without the undesirable estrogenic feminizing side-effects.

The following examples illustrate in detail the preparation of representative pregnapentaen steroids of the present invention.

EXAMPLE I

*Preparation of 21-acetoxy-3,17$\alpha$-dihydroxy-19-norpregna-1,3,5(10),6,8-pentaen-20-one*

A. A solution of 21-acetoxy-9$\alpha$,11$\beta$-dichloro-17$\alpha$-hydroxypregna-1,4-diene-3,20-dione (1.01 g.) (U.S. Patent 2,894,963) and lithium chloride (0.285 g.) in dimethylformamide (50 ml.) is reacted and worked up as described in our co-pending application (Example 2) Serial No. 320,559, filed October 31, 1963, now United States Patent No. 3,182,057, to give 0.82 g. of solid. This is triturated with warm ether and filtered. The filtrate is evaporated to a glass, methanol is added and the resultant crystalline solid is filtered and washed with methanol to give the product of the example (0.207 g.), melting point 196.5°–198.5° C. One additional crystallization from acetone-hexane does not appreciably alter the melting point, 197°–199° C.

B. A solution of 21-acetoxy-9$\alpha$,11$\beta$-dichloro-17$\alpha$-hydroxypregna-1,4-diene-3,20-dione (2.0 g.) and lithium chloride (0.56 g.) in dimethylformamide (100 ml.) is reacted and worked up in the usual manner to give 1.50 g. of solid, melting point 95°–155° C. A portion (1.3 g.) in pyridine (10 ml.) and acetic anhydride (5 ml.) is allowed to stand at room temperature overnight. After the addition of methanol and benzene the reaction mixture is evaporated under reduced pressure to dryness. The residue (1.35 g.) is dissolved in methylene chloride (15 ml.) and adsorbed on a synthetic-magnesium silicate (90 g.) column. Elution with 7% acetone-hexane (13 x 100 ml. fractions) yields the 3,21-diacetate (0.34 g.), melting point 180°–183° C. after crystallization from acetone-hexane. Three additional crystallizations from the same solvent pair gives the analytical sample (0.27 g.) of 3,21-diacetoxy-17$\alpha$-hydroxy-19-norpregna-1,3,5 (10),6,8-pentaen-20-one, melting point 184°–186° C.

C. A solution of 21-acetoxy-9α,11β-dichloro-17α-hydroxypregna-1,4-diene-3,20-dione (1.0 g.) in pyridine (50 ml.) is heated under reflux for 22.5 hours. The reaction mixture is evaporated under reduced pressure to a glass which is dissolved in a small amount of acetone. The addition of a large volume of water together with scratching with a glass rod precipitates 0.77 g. of solid. Trituration of the solid with warm ether is followed by filtration. The ether filtrate is evaporated to a glass. Crystallization of the residue from methanol gives 21-acetoxy - 3,17α - dihydroxy-19-norpregna - 1,3,5(10),6,8-pentaen-20-one (0.24 g.) melting point 193°–196° C. which on recrystallization is raised to 197°–199° C.

D. A solution of 21-acetoxy-9α,11β-dichloro-17α-hydroxypregna-1,4-diene-3,20-dione (50 mg.) in dimethylformamide is refluxed 30 minutes. The solution is concentrated to near dryness, water is added and the resultant viscous oil is worked with a glass rod until a solid is formed. Filtration gives material (30 mg.) with the identical ultraviolet and infrared spectra to the above samples of 21-acetoxy-3,17α-dihydroxy-19-norpregna-1,3,5(10),6,8-pentaen-20-one.

EXAMPLE II

*Preparation of 3,17α,21-trihydroxy-19-norpregna-1,3,5(10),6,8-pentaen-20-one*

A solution of 21-acetoxy-3,17α-dihydroxy-19-norpregna-1,3,5(10),6,8-pentaen-20-one (0.15 g.) in methanol (30 ml.) is treated with 10% aqueous potassium carbonate solution (1.5 ml.) while under an atmosphere of argon. After 30 minutes at room temperature, glacial acetic acid (0.12 ml.) is added and the reaction mixture is evaporated under reduced pressure. The residue is heated with acetone and the insoluble potassium acetate is removed by filtration. Concentration of the filtrate with simultaneous addition of hexane gives the product of the example (0.10 g.), melting point 240°–244° C. Two further crystallizations from acetone-hexane gives the analytical sample (0.07 g.), melting point 245°–249° C.

EXAMPLE III

*Preparation of 19-norpregna-1,3,5(10),6,8-pentaene-3,17α,20,21-tetrol*

A solution of 3,17α,21-trihydroxy-19-norpregna-1,3,5(10),6,8-pentaen-20-one (0.024 g.) and sodium borohydride (0.024 g.) in absolute ethanol (2 ml.) and one drop of water is allowed to stand at room temperature for one hour. It is then neutralized with dilute sulfuric acid, diluted with water and extracted with ethyl acetate. The extract is washed with saturated saline, dried over magnesium sulfate and evaporated under reduced pressure to give crude 19-norpregna-1,3,5(10),6,8-pentaene-3,17α,20,21-tetrol (0.019 g.), melting point 208°–214° C. with previous softening.

EXAMPLE IV

*Preparation of 21-acetoxy-3,17α-dihydroxy-16α-methyl-19-norpregna-1,3,5(10),6,8-pentaen-20-one*

A solution of 1.0 g. of 21-acetoxy-9α,11β-dichloro-17α-hydroxy - 16α - methylpregna - 1,4 - diene-3,20-dione (U.S. Patent No. 2,894,963) in 50 ml. of dimethylformamide is reacted and worked up as described in Example ID above. The crude product is isolated, chromatographed and crystallized from acetone-hexane to give 21-acetoxy - 3,17α - dihydroxy - 16α - methyl-19-norpregna-1,3,5(10),6,8-pentaen-20-one.

EXAMPLE V

*Preparation of 21-acetoxy-3,17α-dihydroxy-16β-methyl-19-norpregna-1,3,5(10),6,8-pentaen-20-one*

A solution of 1.0 g. of 21-acetoxy-9α,11β-dichloro-17α-hydroxy-16β-methylpregna-1,4-diene - 3,20 - dione (U.S. Patent No. 2,894,963) in 50 ml. of dimethylformamide is reacted and worked up as described in Example ID above. The crude product is isolated, chromatographed, and crystallized from acetone-hexane to give 21-acetoxy-3,17α-dihydroxy-16β-methyl - 19 - norpregna-1,3,5(10),6,8-pentaen-20-one.

EXAMPLE VI

*Preparation of 21-acetoxy-3,17α-dihydroxy-6-methyl-19-norpregna-1,3,5(10),6,8-pentaen-20-one*

One gram of 21-acetoxy-9α,11β-dichloro-17α-hydroxy-6α-methylpregna-1,4-diene-3,20-dione (U.S. Patent No. 2,894,963) in 50 ml. of dimethylformamide is reacted and worked up in the manner of Example ID above. The crude product is isolated, chromatographed and crystallized from acetone-hexane to give 21-acetoxy-3,17α-dihydroxy-6-methyl - 19 - norpregna-1,3,5(10),6,8-pentaen-20-one.

EXAMPLE VII

*Preparation of 21-acetoxy-6-monofluoromethyl-3,17α-dihydroxy-19-norpregna-1,3,5(10),6,8-pentaen-20-one*

Following the procedure described in Example ID 21-acetoxy-9α,11β-dichloro - 6α - monofluoromethyl-17α-hydroxypregna - 1,4 - diene-3,20-dione (U.S. Patent No. 3,038,898) is converted into the product of the example by heating with dimethylformamide.

EXAMPLE VIII

*Preparation of 21-acetoxy-6-difluoromethyl-3,17α-dihydroxy-19-norpregna-1,3,5(10),6,8-pentaen-20-one*

Following the procedure of Example ID 21-acetoxy-9α,11β-dichloro - 6α - difluoromethyl-17α-hydroxypregna-1,4-diene-3,20-dione (U.S. Patent No. 3,038,898) is converted into the product of the example by heating with dimethylformamide.

EXAMPLE IX

*Preparation of 21-propionoxy-6-trifluoromethyl-3,17α-dihydroxy-19-norpregna-1,3,5(10),6,8-pentaen-20-one*

Following the procedure described in Example ID 21-propionoxy-9α,11β-dichloro-6α-trifluoromethyl - 17α - hydroxy - pregna-1,4-diene-3,20 - dione (U.S. Patent No. 3,038,898) is converted into the product of the example by heating with dimethylformamide.

EXAMPLE X

*Preparation of 3-hydroxy-19-norpregna-1,3,5(10),6,8-pentaen-20-one*

Using the procedure of Example ID 9α,11β-dichloropregna-1,4-diene-3,20-dione [J. Am. Chem. Soc., 82, 2308 (1960)] is converted into the product of the example by heating with dimethylformamide.

EXAMPLE XI

*Preparation of 21-acetoxy-9α,11β-dichloro-6α-fluoro-17α-hydroxypregna-1,4-diene-3,20-dione*

A stirred solution of 0.25 g. of 21-acetoxy-6α-fluoro-17α-hydroxypregna-1,4,9(11)-triene - 3,20 - dione (U.S. Patent No. 2,838,449) and 1.0 g. of lithium chloride in 10 ml. of glacial acetic acid is cooled to 5°–10° C. and is treated with 0.091 g. of N-chloro-succinimide followed by 0.25 ml. of a saturated solution of anhydrous hydrogen chloride in tetrahydrofuran. After stirring at room temperature for 3 hours, the reaction mixture is poured into ice-water and the crude product is filtered and washed with water. The moist solid is dissolved in methylene chloride, dried over anhydrous magnesium sulfate and evaporated under reduced pressure to give 0.27 g. of the product of this example. Recrystallization from methylene chloride-methanol gives the pure 21-acetoxy-9α,11β-dichloro - 6α - fluoro-17α-hydroxy-pregna-1,4-diene-3,20-dione; M.P. 248°–250° C. dec.; $[\alpha]_D^{25}+121°$ (pyridine);

$\lambda_{max.}^{MeOH}$ 234 mμ (ε 15,500)

This compound is biologically active in a thymolytic assay which is presumptive of anti-inflammatory activity.

EXAMPLE XII

*Preparation of 21-acetoxy-6-fluoro-3,17α-dihydroxy-19-norpregna-1,3,5(10),6,8-pentaen-20-one*

A solution of 1.0 g. of 21-acetoxy-9α,11β-dichloro-6α-fluoro-17α-hydroxypregna-1,4-diene-3,20-dione in 50 ml. of dimethylformamide is heated under reflux for 30 minutes. The yellow-orange solution is evaporated under reduced pressure to dryness, water is added and the resultant oil is scratched with a glass rod to afford 0.756 g. of solid. Trituration of the solid with warm ether is followed by filtration. The ether filtrate is evaporated to a glass (0.476 g.) which is dissolved in methylene chloride and adsorbed on a synthetic magnesium silicate column. Elution with 10% acetone-hexane gives 0.107 g. of 21-acetoxy-6-fluoro-3,17α-dihydroxy-19-norpregna-1,3,5(10),6,8-pentaen-20-one.

EXAMPLE XIII

*Preparation of 3,21-diacetoxy-6-fluoro-17α-hydroxy-19-norpregna-1,3,5(10),6,8-pentaen-20-one*

A solution of 0.107 g. of 21-acetoxy-6-fluoro-3,17α-dihydroxy-19-norpregna-1,3,5(10),6,8-pentaen-20-one in 2 ml. of pyridine and 1 ml. of acetic anhydride is allowed to stand at room temperature overnight. The addition of ice-water followed by filtration affords 0.10 g. of solid which is dissolved in methylene chloride and chromatographed on a synthetic magnesium silicate. Elution with 7% acetone-hexane gives 0.077 g. of product. Recrystallization from acetone-hexane affords pure 3,21-diacetoxy-6-fluoro-17α-hydroxy-19-norpregna-1,3,5(10),6,8-pentaen-20-one; melting point 203°–205.5° C.

EXAMPLE XIV

*Preparation of 6-fluoro-3-hydroxy-19-norpregna-1,3,5(10),6,8-pentaen-20-one*

A. One gram of 9α,11β-dichloro-6α-fluoro-pregna-1,4-diene-3,20-dione (U.S. Patent 3,009,930) in 50 ml. of dimethylformamide is reacted and worked up in the manner of Example XII above. The crude product is isolated, chromatographed, and crystallized from acetone-hexane to give 6-fluoro-3-hydroxy-19-norpregna-1,3,5(10),6,8-pentaen-20-one.

B. One gram of 9α,11β-dichloro-6β-fluoro-pregna-1,4-diene-3,20-dione (U.S. Patent No. 3,009,930) in 50 ml. of dimethylformamide is reacted and worked up as described in Example XII above. The product obtained is identical with that obtained in Example XIV-A above, namely, 6-fluoro-3-hydroxy-19-norpregna-1,3,5(10),6,8-pentaen-20-one.

We claim:
1. A steroid of the formula:

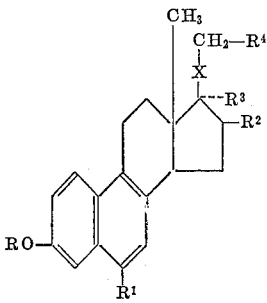

wherein R is selected from the group consisting of hydrogen and lower alkanoyl; $R^1$ is selected from the group consisting of hydrogen, methyl, fluoromethyl, difluoromethyl, trifluoromethyl and fluorine; $R^2$ is selected from the group consisting of hydrogen, (α)-methyl and (β)-methyl; $R^3$ is selected from the group consisting of hydrogen and hydroxyl; $R^4$ is selected from the group consisting of hydrogen, hydroxyl and lower alkanoyloxy and X is selected from the group consisting of >C=O and

2. 21-lower alkanoyloxy-3,17α-dihydroxy-19-norpregna-1,3,5(10),6,8-pentaen-20-ones.
3. The compound 21-acetoxy-3,17α-dihydroxy-19-norpregna-1,3,5(10),6,8-pentaen-20-one.
4. The compound 3,17α,21-trihydroxy-19-norpregna-1,3,5(10),6,8-pentaen-20-one.
5. The compound 19-norpregna-1,3,5(10),6,8-pentaene-3,17α,20-21-tetrol.
6. The compound 21-acetoxy-3,17α-dihydroxy-16α-methyl-19-norpregna-1,3,5(10),6,8-pentaen-20-one.
7. The compound 21-acetoxy-3,17α-dihydroxy-16β-methyl-19-norpregna-1,3,5(10),6,8-pentaen-20-one.
8. The compound 21-acetoxy-3,17α-dihydroxy-6-methyl-19-norpregna-1,3,5(10),6,8-pentaen-20-one.
9. The compound 21-acetoxy-6-monofluoromethyl-3,17α-dihydroxy-19-norpregna-1,3,5(10),6,8-pentaen-20-one.
10. The compound 21-acetoxy-6-difluoromethyl-3,17α-dihydroxy-19-norpregna-1,3,5(10),6,8-pentaen-20-one.
11. The compound 21-propionoxy-6-trifluoromethyl-3,17α-dihydroxy-19-norpregna-1,3,5(10),6,8-pentaen-20-one.
12. The compound 21-acetoxy-6-fluoro-3,17α-dihydroxy-19-norpregna-1,3,5(10),6,8-pentaen-20-one.
13. The compound 3,21-diacetoxy-6-fluoro-17α-hydroxy-19-norpregna-1,3,5(10),6,8-pentaen-20-one.
14. The compound 6-fluoro-3-hydroxy-19-norpregna-1,3,5(10),6,8-pentaen-20-one.

References Cited by the Examiner

UNITED STATES PATENTS 3,009,930 11/61 Reimann et al. _____ 260—397.3
3,013,011 12/61 Nussbaum et al. _____ 260—239.55

LEWIS GOTTS, *Primary Examiner.*